(No Model.)

J. ADAMS.
BED RAIL BRACE.

No. 326,618. Patented Sept. 22, 1885.

WITNESSES:
O. A. Clark,
Clarence H. Buckles

INVENTOR
Jesse Adams
By J. L. Duffie his atty

United States Patent Office.

JESSE ADAMS, OF GUERNSEY, ARKANSAS.

BED-RAIL BRACE.

SPECIFICATION forming part of Letters Patent No. 326,618, dated September 22, 1885.

Application filed August 9, 1884. (No model.)

*To all whom it may concern:*

Be it known that I, JESSE ADAMS, a citizen of the United States, residing at Guernsey, in the county of Hempstead and State of Arkansas, have invented certain new and useful Improvements in Bed-Rail Braces; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to bedstead-braces; and it consists in the novel construction and arrangement of its parts.

Figure 1:
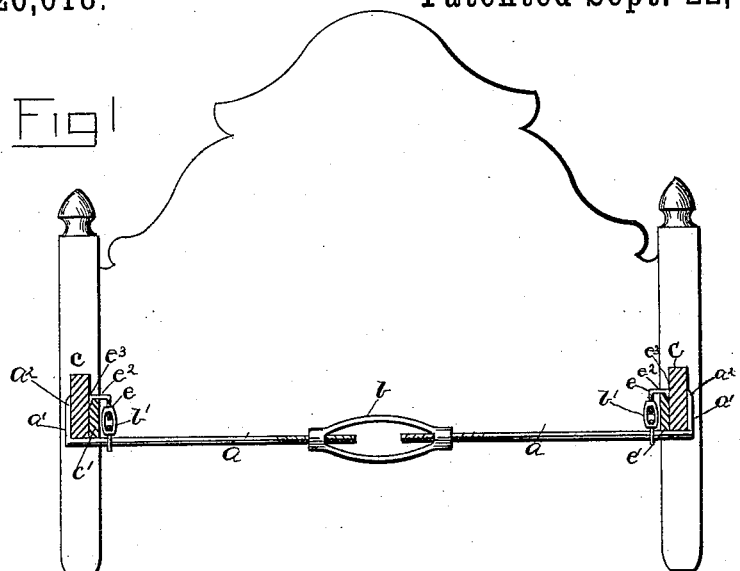
Figure 2:
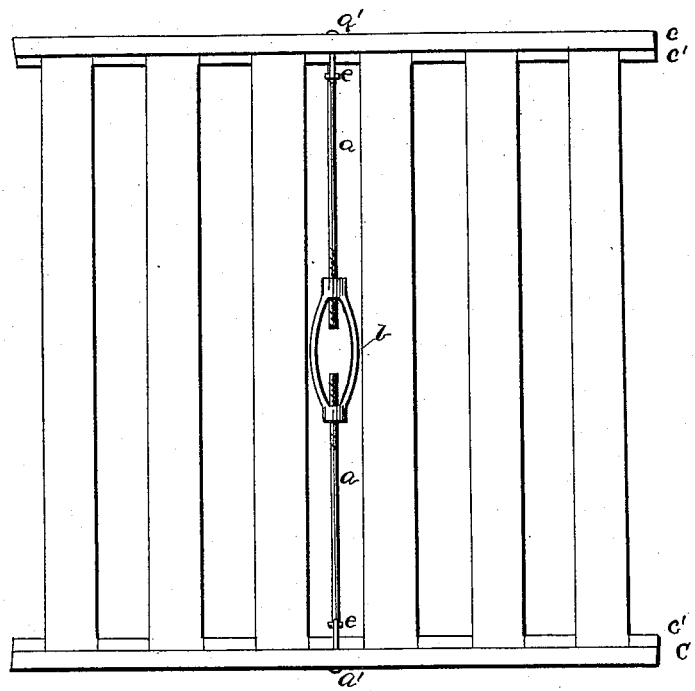
Figure 3:
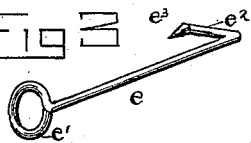

In the accompanying drawings, Figure 1 represents a cross-section of a bedstead, showing my brace attached to the same. Fig. 2 represents a top view of the bedstead bottom, showing my brace attached. Fig. 3 represents my brace-dog.

My invention is described as follows: I take two rods of iron, $a\ a$, or other suitable metal, and turn up an L, $a'\ a'$, on the end of each. On these turned-up ends I make a flat face, $a^2\ a^2$. On the round ends of these rods I cut threads and screw them into a turn-buckle, $b$. The face $a^2$ of the turned-up L is flat and smooth, so that it will not scratch or deface the outer face of the bed-rails $c$ when applied. On each end of this bed-brace, and inside of the bed-rails $c$, I put a dog, $e$. This dog has a ring, $e'$, at one end that slips onto the rods $a\ a$. It also has an arm, $e^2$, which reaches over the top edge of slat-rail $c'$, and a tooth, $e^3$, which is embedded into the upper face of the said slat-rail, and holds the dog in place and prevents the bed-brace from dropping down if the brace should loosen its hold on the bed-rails. This dog is made of two rods, and each rod has threaded ends, which are screwed into a bow-nut, $b'$, similar to bow-nut $b$.

For a cheap manufacture I shall make my dog of one piece, as shown in Fig. 3.

My bed-brace is applied as follows: I open the brace until the turned-up ends $a'\ a'$ will fit up against the outer face of the bed-rails. I put the same in position, as shown in Fig. 1. Then I turn the turn-buckle until the faces $a^2\ a^2$ are brought up tight against the outer face of bed-rails $c$. Then I slip dogs $e$ up against the inner face of slat-rail $c'$, extending its arm $e^2$ over the top of said slat-rail $c'$, and turn turn-buckle $b'$ until I embed its tooth $e^3$ into the upper face of said slat-rail. This prevents the dog from working out of place, and the dog prevents the bed-base from dropping to the floor.

Experience has taught that the bed-slats, constantly springing under the pressure of the occupants, gradually spring the bed-rails outward until, at length, they become so wide apart in the middle as to allow the slats to fall through. My bed-brace will prevent the side rails of a new bed from thus springing, and where the bed-rails have already sprung will bring them back into proper position.

Having described my invention, what I claim as new, and desire to secure by Letters Patent, is—

The combination of turn-buckle $b$, with rods $a\ a$, having threaded ends screwing into said turn-buckle $b$, and a turned up L, $a'$, on their outer ends having a smooth face, $a^2$, fitting against the outer face of bed-rails $c$, with dog $e$ working on said rods $a$, and embedding its tooth $e^3$ in the upper face of slat-rail $c'$, substantially as shown and described, and for the purposes set forth.

In testimony whereof I affix my signature in presence of two witnesses.

JESSE ADAMS.

Witnesses:
G. W. MOSS,
W. H. ROBARTS.